Sept. 28, 1965  P. M. CLAYTON  3,208,756
INTERNAL COMBUSTION ENGINE SEAL
Filed May 28, 1962
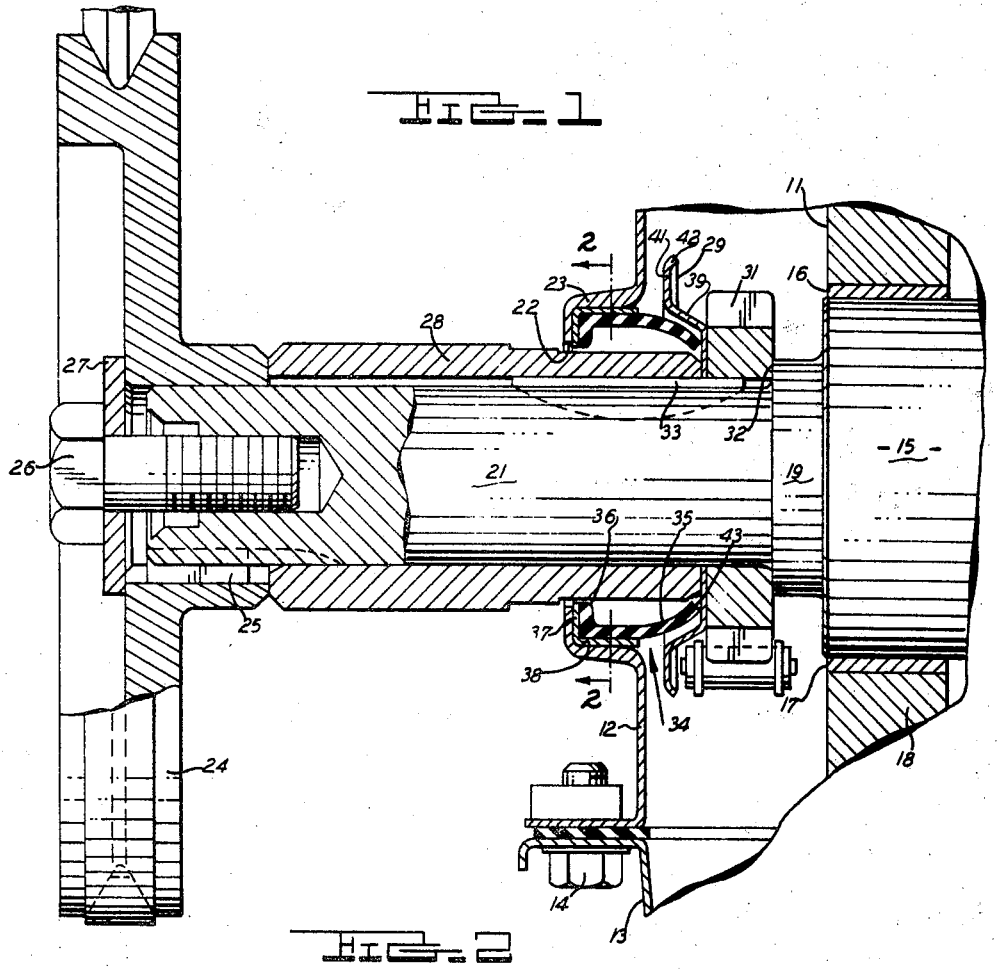
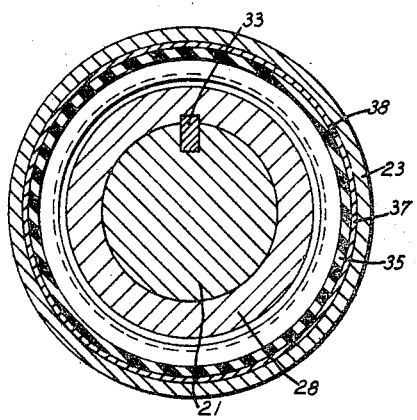
PAUL M. CLAYTON
INVENTOR.
BY John L. Faulkner
Thomas H. Oster
Ernest A. Beutler
ATTORNEYS

3,208,756
INTERNAL COMBUSTION ENGINE SEAL
Paul M. Clayton, Birmingham, Mich., assignor to Ford Motor Company, Dearborn, Mich., a corporation of Delaware
Filed May 28, 1962, Ser. No. 198,378
2 Claims. (Cl. 277—95)

This invention relates to internal combustion engine seals and more particularly to a seal suitable for interposition between a rotating shaft and an aperture formed in a wall through which the shaft passes.

The use of seals to prevent the impingement of foreign matter onto the bearing surfaces of a machine and to preclude leakage of the lubricant from the machine is well known. Frequently a seal must be interposed between a rotating shaft and an aperture in a wall through which the shaft passes. It is difficult to provide an effective seal between rotating and non-rotating members. The problem is increased considerably when the axis of the shaft and the center of the aperture are not coincident as frequently occurs because of manufacturing irregularities. The seals previously used for this purpose have been both complex and costly.

It is, therefore, the object of this invention to provide an effective seal suitable for interposition between a rotating shaft and an aperture formed in a wall through which the shaft passes.

A seal embodying this invention is suitable for use in a machine having a stationary wall with an aperture formed therein and a rotating shaft passing through the aperture. The seal comprises a resilient member secured to the wall around the shaft and a substantially rigid shield affixed to the shaft for rotation therewith. The substantially rigid shield is positioned in juxtaposition to the aperture of the wall and engages the resilient member to deform the latter and form a fluid tight seal therewith.

Other objects and advantages of this invention will become more apparent as this description proceeds, particularly when considered in conjunction with the accompanying drawings wherein:

FIGURE 1 is a cross sectional view of a portion of a machine incorporating this invention.

FIGURE 2 is a cross sectional view taken along the line 2—2 of FIGURE 1.

A portion of an internal combustion engine has been depicted as exemplary of an environment for the seal that constitutes this invention. Referring specifically to the drawings, an engine cylinder block is indicated generally at 11. Affixed to the cylinder block 11 is a front cover 12. An oil pan 13 is secured to the front cover 12 by bolt means 14 and to the cylinder block 11 by other suitable fastening means (not shown). A crankshaft 15 is rotatably supported within the cylinder block 11 by bearing elements 16 and 17 secured within the cylinder block 11 and a bearing cap 18.

Adjacent the bearing elements 16 and 17, the crankshaft 15 is provided with a reduced diameter portion 19. The end of the crankshaft 15 has a still further reduced portion 21 that extends through an aperture 22 formed in a cup shaped portion 23 of the front cover 12. A pulley sheave 24 is supported upon the extending end of the crankshaft portion 21. The pulley sheave 24 is fixed against rotation relative to the crankshaft 15 by a key 25.

The pulley sheave 24 is axially fixed upon the crankshaft 15 by a bolt 26 threaded into the end of the crankshaft portion 21. The head of the bolt 26 bears against a washer 27 that, in turn, urges the pulley sheave 24 against a cylindrical spacer element 28 positioned around the crankshaft portion 21. The inner end of the spacer element 28 contacts a shield or oil slinger 29 that forms a portion of the seal assembly, to be described. The oil slinger 29 is in abutment with a timing gear 31 that abuts a shoulder 32 formed by juncture of the crankshaft portions 19 and 21. The spacer element 28, the oil slinger 29 and the timing gear 31 are secured for rotation with the crankshaft portion 21 by a key 33.

The seal assembly, indicated generally at 34 prevents the entry of foreign matter into the engine through the front cover aperture 22 and additionally prevents lubricant from leaking from within the engine. The seal assembly 34 includes the oil slinger 29 and an elastomeric member 35 positioned around the crankshaft portion 21. The elastomeric member 35 has a base part 36 that is fixed within a substantially rigid retaining element 37. The retaining element 37 is secured by a force fit within the internal diameter 38 of the cup shaped portion 23 of the front cover 12.

The oil slinger 29 has a dish shaped central portion 39, a rim portion 41 that extends parallel to the inner wall of the front cover 12 and a curved edge portion 42. The outside diameter of the oil slinger 29 is considerably greater than the diameter of the aperture 22 in the front cover 12.

A lip portion 43 of the elastomeric member 35 is engaged by and deflected radially inwardly between dish shaped portion 39 of the oil slinger 29. The intimate contact between the lip portion 43 and the oil slinger 29 presents a fluid tight seal between these parts. This seal cannot be affected by differences in the axis of the crankshaft 15 and the center of the aperture 22.

Because the outside diameter of the oil slinger 29 is greater than the diameter of the aperture 22 of the front cover 12, any lubricant that is flung from the moving parts of the engine must impinge upon the oil slinger 29. The rotary movement of the oil slinger 29 and its curved edge portion 42 will throw the impinged oil away from the aperture 22.

It is to be understood that the invention is not limited to the exact construction shown and described, but that various changes and modifications may be made without departing from the spirit and scope of the invention as defined by the appended claims.

I claim:

1. In a lubricated machine having lubricated parts, a stationary wall, one side of said wall being in facing relationship to said lubricated parts, a cylindrical aperture in said wall, a rotating shaft extending through said cylindrical aperture on said one side of said wall, a seal having a substantially rigid cylindrical part affixed in said aperture with its axis extending in the same direction as the axis of said shaft and a resilient lip portion affixed to said cylindrical portion and extending coaxially with said shaft toward said lubricated parts, and a substantially rigid shield affixed to said shaft around its circumference, said shield being interposed between said wall and said lubricated parts, said shield having a central radially planar portion engaging said resilient lip portion in fluid tight contact and deforming said lip portion radally inwardly toward said shaft, said shield further having an axially extending portion extending from a point radially outwardly of the point of contact between said central portion and said lip portion toward said wall.

2. In a lubricated machine as defined by claim 1 wherein the shield has a greater external diameter than the internal diameter of the aperture to preclude lubricant from impinging on said seal and aperture.

References Cited by the Examiner

UNITED STATES PATENTS 2,251,012 7/41 Delaval-Crow _____ 277—95 XR
2,634,141 4/53 McIntyre et al. ____ 277—133 XR
2,639,954 5/53 Potter _____ 277—95 XR

FOREIGN PATENTS 446,503 7/27 Germany.
851,630 10/52 Germany.

LEWIS J. LENNY, *Primary Examiner.*

EDWARD V. BENHAM, *Examiner.*